(12) United States Patent
Ragan (10) Patent No.: US 9,371,193 B2
(45) Date of Patent: Jun. 21, 2016

(54) ELECTROMAGNETICALLY ACTUATED SORTER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 52 days.

(21) Appl. No.: 14/078,289

(22) Filed: Nov. 12, 2013

(65) Prior Publication Data

US 2015/0129393 A1 May 14, 2015

(51) Int. Cl.
*B65G 47/53* (2006.01)
*B65G 39/08* (2006.01)
*B65G 13/10* (2006.01)
*B65G 17/24* (2006.01)
*B65G 13/06* (2006.01)
*B65G 54/02* (2006.01)

(52) U.S. Cl.
CPC ............... *B65G 47/53* (2013.01); *B65G 39/08* (2013.01)

(58) Field of Classification Search
None
See application file for complete search history.

(56) References Cited

U.S. PATENT DOCUMENTS

| | | | |
|---|---|---|---|
| 4,234,076 A | 11/1980 | Spodig | |
| 5,333,722 A | 8/1994 | Ouellette | |
| 5,749,454 A | 5/1998 | Layne | |
| 5,895,598 A * | 4/1999 | Kitano | B21B 27/055 100/92 |
| 5,899,320 A | 5/1999 | Miyasaka | |
| 5,971,133 A | 10/1999 | Wilkins | |
| 6,244,427 B1 | 6/2001 | Syverson | |
| 6,710,505 B1 * | 3/2004 | Barani | B65G 13/06 198/784 |
| 6,889,815 B2 | 5/2005 | Kanamori et al. | |
| 6,938,750 B2 | 9/2005 | Miller et al. | |
| 7,040,478 B2 | 5/2006 | Ehlert | |
| 7,987,970 B2 | 8/2011 | Schwesig | |
| 8,511,460 B2 | 8/2013 | Ragan et al. | |
| 8,567,587 B2 | 10/2013 | Faist et al. | |
| 2003/0132143 A1 | 7/2003 | Cochran et al. | |
| 2007/0188454 A1 * | 8/2007 | O'Sullivan | G06F 3/03543 345/163 |
| 2008/0169171 A1 * | 7/2008 | Itoh | B65G 47/54 198/412 |
| 2010/0213031 A1 * | 8/2010 | Krech | B60L 13/10 198/574 |
| 2010/0230245 A1 | 9/2010 | Ragan et al. | |
| 2013/0192954 A1 | 8/2013 | Fourney | |

FOREIGN PATENT DOCUMENTS

| | | |
|---|---|---|
| EP | 0425021 B1 | 6/1993 |
| JP | H07-8331 U | 2/1995 |
| JP | 2009062188 A | 3/2009 |
| WO | 2013169343 A1 | 11/2013 |

OTHER PUBLICATIONS

International Search Report and Written Opinion of the International Searching Authority, PCT/US2014/061176, mailed Jan. 29, 2015, Korean Intellectual Property Office, Republic of Korea.

* cited by examiner

*Primary Examiner* — Kavel Singh
(74) *Attorney, Agent, or Firm* — James T. Cronvich (57) ABSTRACT

A sorting conveyor having electromagnetically actuated rollers for sorting articles off one or both sides of the conveyor. A linear stator creates a magnetic flux wave that rotates rotors in the article-supporting rollers and selects their direction of rotation. In one version the magnetic flux wave swivels the rollers to change the sorting direction. In another version the magnetic flux wave causes one set of rollers or another set of orthogonally disposed rollers to contact conveyed articles.

23 Claims, 6 Drawing Sheets

ELECTROMAGNETICALLY ACTUATED SORTER

BACKGROUND

The invention relates generally to power-driven conveyors and more particularly to sorting conveyors having diverting rollers actuated electromagnetically.

Sorting conveyors, or sorters, are used to selectively divert conveyed articles to discharge conveyors or terminals on one or the other side of the sorter. One example of such a sorter is a swivel sorter having an array of rollers mounted at individual pivotable assemblies. The assemblies are pivoted, or swiveled, to orient the rollers to direct conveyed articles along trajectories toward either side of the sorter or straight ahead. The rollers may be freely rotatable and rely on the momentum of articles fed onto the sorter to advance articles along their selected trajectories, or the rollers may be powered by belts to propel the articles along their trajectories. The swiveling and roller-activation mechanisms limit the density of the article-supporting rollers, which, in turn, limits the minimum package size. Furthermore, the actuation mechanisms can be bulky and noisy.

SUMMARY

One version of a sorter embodying features of the invention comprises a platform and a plurality of rollers supported by the platform. At least some of the rollers have rotors that can rotate about axes of rotation. Armature elements supported by the platform are associated with the plurality of rollers. A linear stator propagates a magnetic flux wave across the platform. The magnetic flux wave interacts with the rotors and the armature elements. A controller controls the amplitude and propagation direction of the magnetic flux wave to selectively rotate the rollers with rotors and to selectively energize the armature elements to sort articles conveyed atop the rollers in selected sorting directions.

Another version of a sorter embodying features of the invention comprises a plurality of roller assemblies supported by a platform. Each of the roller assemblies includes a cradle that can pivot about a vertical axis. And each cradle has an armature element. Each roller assembly also has a roller with a rotor that can rotate in the cradle about an axis of rotation. A linear stator propagates a magnetic flux wave across the platform. The flux wave interacts with the rotors to rotate the rollers about their axes of rotation. The flux wave also interacts with the armature elements to pivot the cradles about their vertical axes to change the orientation of the axes of rotation of the rollers.

In another aspect of the invention, a sorter comprises first and second rollers supported by a platform having a length and a width. The first rollers have rotors that can rotate about a first axial direction. The second rollers can rotate about a second axial direction that is perpendicular to the first axial direction. The second rollers have armature elements. The second rollers are movable between a first level above the level of the first rollers and a second level below the level of the first rollers. A linear stator propagates a magnetic flux wave that travels along the second axial direction and through the first and second rollers. The flux wave interacts with the rotors to rotate the first rollers about the first axial direction and with the armature elements to move the second rollers through the second level below the level of the first rollers.

BRIEF DESCRIPTION OF THE DRAWINGS

These aspects and features of the invention, as well as its advantages, are described in more detail in the following description, appended claims, and accompanying drawings, in which:

DETAILED DESCRIPTION

Figure 1:
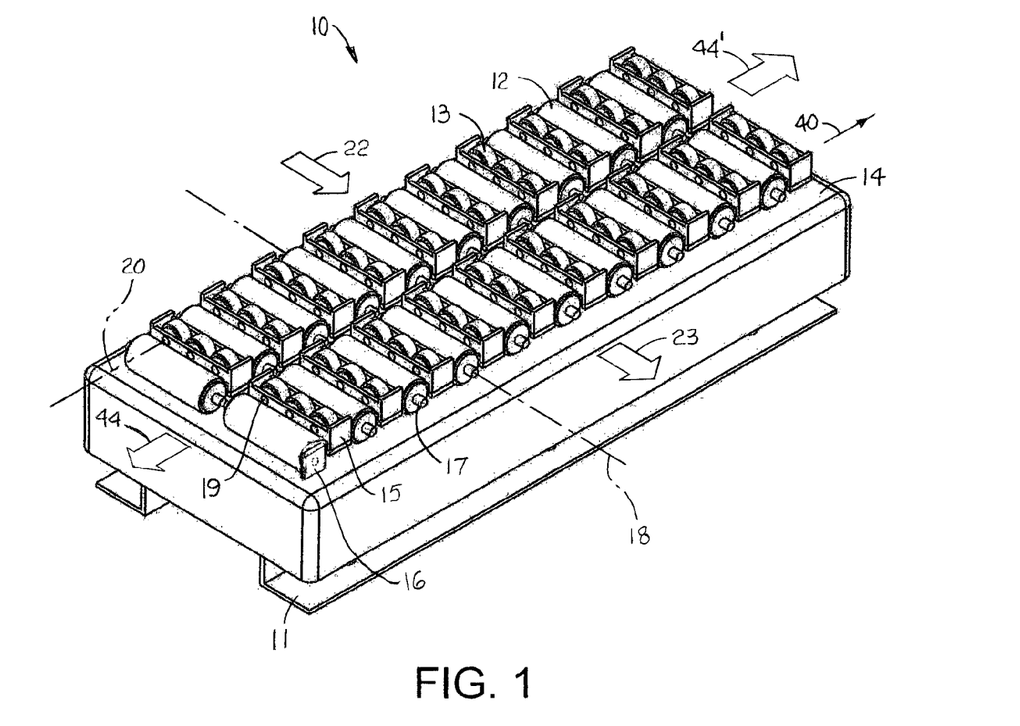
FIG. 1 is an isometric view of a portion of a sorter embodying features of the invention.

One version of a sorting conveyor embodying features of the invention is shown in FIG. 1. The sorter 10 has first and second pluralities of rollers 12, 13 supported on a frame, such as a platform 14, mounted in a conveyor framework 11. In this example the first rollers 12 are long rollers, and the second rollers 13 are short rollers arranged in groups of three in cradles 15. The long rollers 12 are each supported at opposite ends by end supports 16 (shown at only one position to simplify the drawing). The long rollers 12 have axles 17 defining axes of rotation 18 in an axial direction parallel to the length of the platform 14. The short rollers 13 have axles 19 supported in the cradles 15 along axes of rotation 20 in an axial direction parallel to the width of the platform 14 and perpendicular to the axes 18 of the long rollers.

Figure 2:
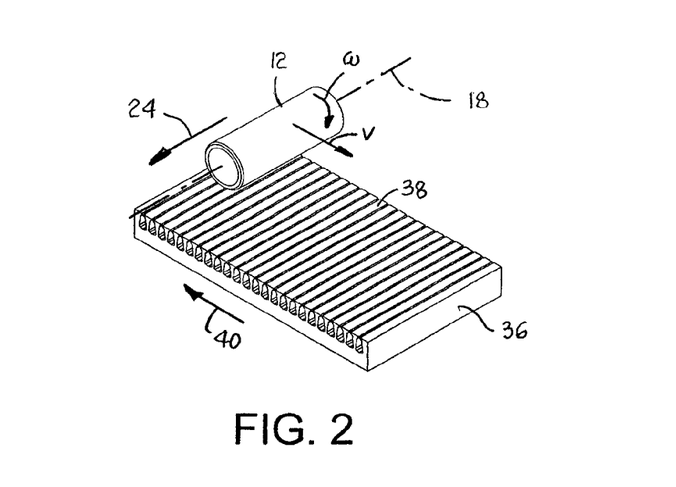
FIG. 2 is an isometric view showing a linear magnetic-field-generating stator for the sorter of FIG. 1.
Figure 3:
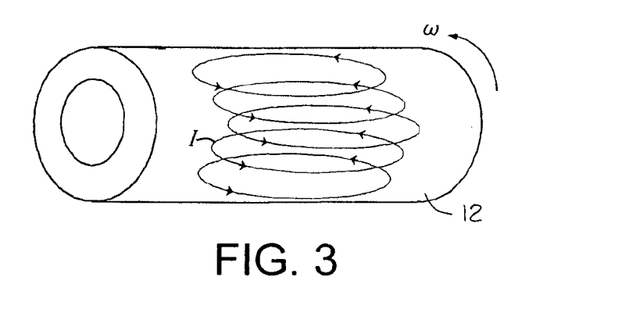
FIG. 3 is an enlarged view of a roller in the sorter of FIG. 1 showing circulating currents induced in the rotor of the roller.
Figure 4A:
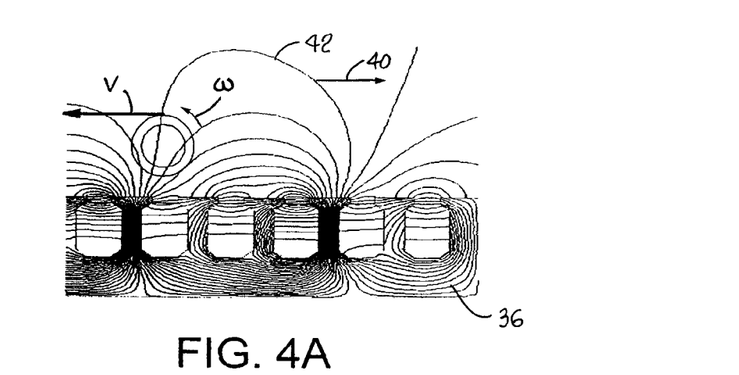
FIGS. 4A-4C are side views of the stator of FIG. 2 showing the magnetic flux pattern as the field moves from left to right in the figure.
Figure 4B:
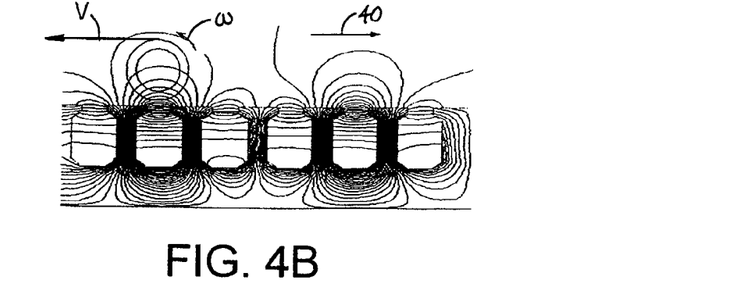
Figure 4C:
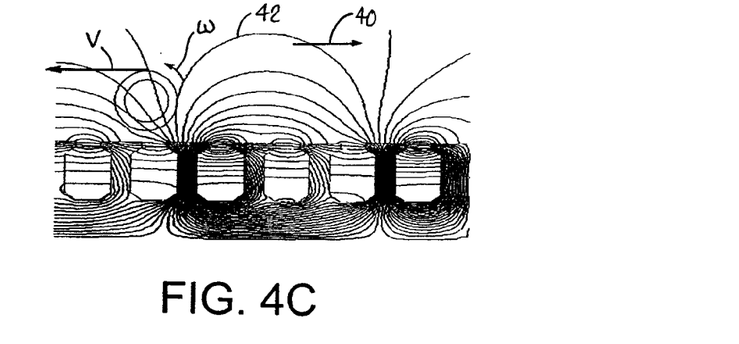

The long rollers 12, as also shown in FIG. 2, are cylindrical and made of an electrically conductive material, such as aluminum or copper. The aluminum or copper could form the outer surface of the rollers, or the aluminum or copper could be covered by another material, such as a plastic or elastomeric material that would exhibit desirable properties for contact with conveyed articles. The roller 12 is depicted in FIG. 2 as a hollow conductive tube. Housed in the platform 14 of FIG. 1 is a magnetic-field source, such as the stator 36 of a linear induction motor. The linear stator 36 has a series of poles 38 that are energized to produce a magnetic flux wave that travels along the length of the stator in a propagation direction 40 across the width of the platform. The poles 38 are energized by coil windings (not shown) conventionally wound around the poles and connected to a conventional three-phase ac power source (not shown). As shown in FIGS. 3 and 4A-4C, the magnetic flux wave 42 traveling along the stator 36 induces a circulating current I in the proximately located electrically conductive roller 12. The current I produces a magnetic field that opposes the change in the flux of the electromagnetic field produced by the stator 36. The interaction of the stator field (the primary field) with the induced field (the secondary field) produces a force that rotates the roller at a rotational speed ω and a tangential velocity υ at the top of the roller opposite to the propagation direction 40. In this way an article fed in the direction of the arrow 22 onto the long rollers 12 from an infeed conveyor in FIG. 1 is pushed off the side of the sorter 10 in the transverse direction 44. If the propagation direction of the magnetic wave is reversed in the stator, the rollers 12 rotate in the opposite direction and push the article off the other side in the opposite transverse direction 44'. The axes of rotation 18 of the long rollers are perpendicular to the stator-wave propagation direction 40 and parallel to the direction of belt travel 24, which causes the rollers to push conveyed articles across the platform 14 in the direction 44 perpendicular, or transverse, to the infeed direction 22.

Figure 5A:
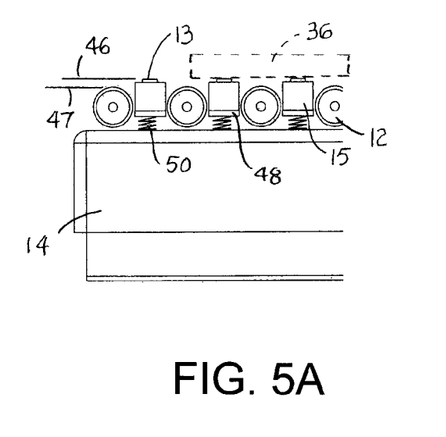
FIGS. 5A and 5B are enlarged front elevation views of one side of the sorter of FIG. 1 with in-line rollers in raised and lowered positions.
Figure 5B:
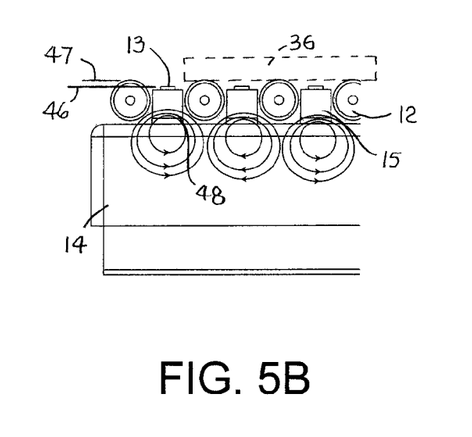

The foregoing description of operation applies when the level 46 of the short rollers 13 is below the level 47 of the long rollers 12, as shown in FIG. 5B, so that the articles 36 ride on the long rollers. (The level referred to is the height of the top of a roller above the platform's top surface. And when a roller is said to be above or below another roller, that refers to the levels of the rollers.) The cradles 15 have ferrous bases 48 that serve as armatures. Springs 50 between the platform 14 and the bases bias the short-roller cradles 15 upward. When the electromagnetic field of the flux wave is present and rotating the long rollers 12, it produces a magnetic force, like that of an electromagnet, and attracts the ferrous armatures down, compressing the springs 50 and lowering the short rollers below the long rollers. The long rollers 12 may have a high-friction rubber or elastomeric outer coating for a better grip on conveyed articles and to gradually brake the articles fed onto the sorter. When the stator is de-energized and the flux wave is absent, as in FIG. 5A, the cradles 15 are released, and the springs 50 push the cradles upward so that the level 46 of the short rollers 32 is above the level 47 of the long rollers 12. In this way an article 36 fed onto the sorter 10 in the direction of the arrow 22, as shown in FIG. 1, rides across the raised short rollers 13 and off the opposite end of the sorter as indicated by the arrow 23. The short rollers 13 shown in this example are passive rollers that are not powered. But they could be made electrically conductive and powered with a dual-axis x-y linear stator that produces orthogonal magnetic flux waves along the length and the width of the sorter to selectively rotate both sets of rollers. Thus, the sorter 10 of FIG. 1 can sort articles entering the sorter (arrow 22) to either side (arrows 44, 44') atop the long rollers, or bypass sorting by passing articles across the length of the platform (arrow 23) over the raised short rollers 13.

Figure 6A:
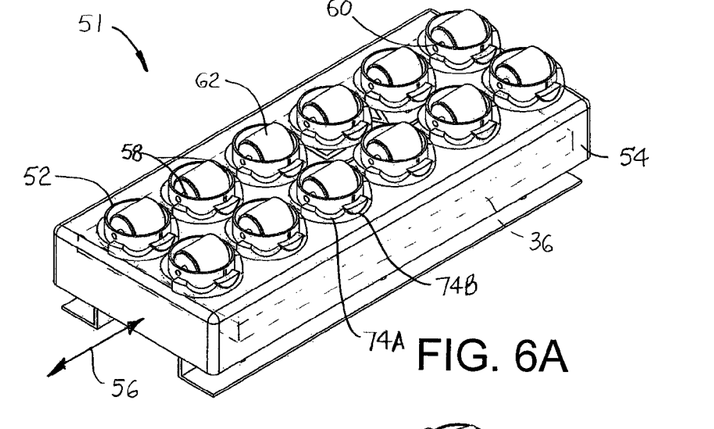
FIGS. 6A-6C are isometric views of a swivel sorter embodying features of the invention showing the transition between swivel positions.

Another version of a sorter 51 is shown in FIG. 6A. Roller assemblies 52 are mounted in cavities in a frame, such as a platform 54. A linear stator 36 is supported in the platform structure and is used to propagate a magnetic flux wave across the width of the platform 54 in or opposite to a direction of propagation 56. The roller assemblies 52 support the ends of axles 58 received in the bores 60 of rollers 62. Like the rollers 12, 13 in the sorter of FIG. 1, the rollers 62 have electrically conductive rotors in which the magnetic field produced by the linear stator induces currents in the rotors that produce a magnetic field. The interaction of the two magnetic fields causes the rotors to rotate. The direction of rotation of the rollers is determined by the direction of the stator's magnetic flux wave.

Figure 6B:
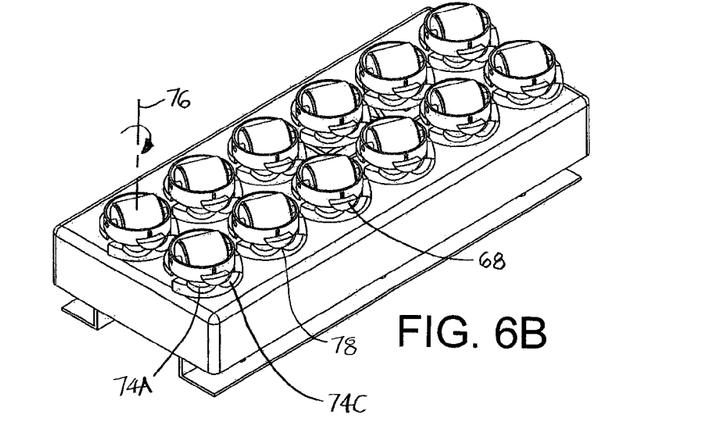
Figure 6C:
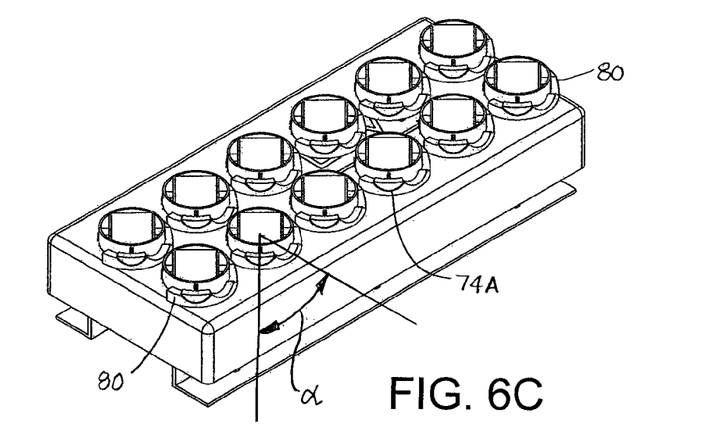
Figure 7:
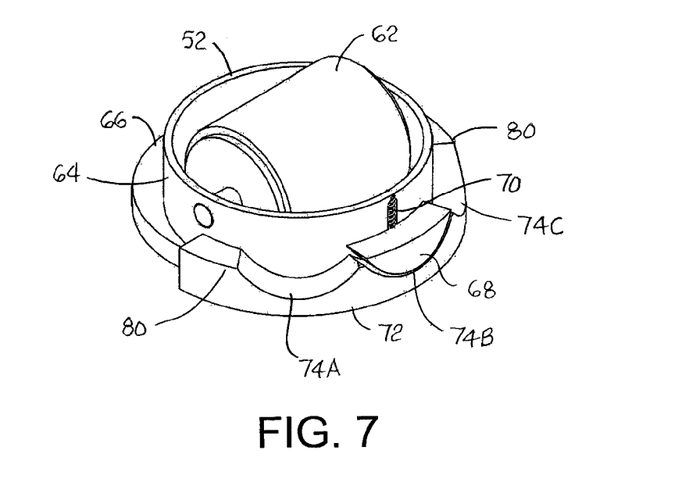
FIG. 7 is an enlarged isometric view of a roller assembly of the swivel sorter of FIG. 6A.

The roller assemblies 52 are arranged to pivot, or swivel, in the cavities about vertical axes. As shown in FIG. 7, the roller assembly 52 includes a circular support ring 64 on a base 66. The base is made of or includes electrically conductive material to make the base an electrically conductive element that serves as an armature that causes the roller assembly to swivel under the influence of a stator-generated magnetic flux wave. The roller assembly 52 also includes a plunger 68 biased downward by a spring 70 housed in a recess in the ring 64. Positioning structure 72 affixed to the platform defines three detents 74A, 74B, and 74C. In FIGS. 7 and 6A the plunger is shown in the middle detent 74B, directing articles straight across the platform 54. The plunger 68 has a shape matched to complement the shape of the detents for stable positioning. Both the concave detents 74 and the convex plunger 68 are rounded to allow the roller assemblies to swivel smoothly from detent position to detent position. FIGS. 6B and 6C show the pivoting of the roller assemblies from the middle detent 74B to a side detent 74A. In FIG. 6B the plunger retracts upward against spring pressure as the stator wave induces the armature 66 to pivot clockwise about its vertical axis 76. A ridge 78, formed between consecutive detents, causes the spring 70 to compress. After the plunger 68, serving as a cam follower, clears the ridge 78, it slides down under spring pressure to the next detent 74 to position the roller 62 at an angle α oblique to the sides of the platform 54. Stops 80 at opposite ends of the positioning structure limit the range of swivel angles about the middle detent 74B.

To return the roller assemblies 54 to their middle positions, a short magnetic pulse in the opposite direction along the linear stator can be generated by the ac power source.

Figure 8A:
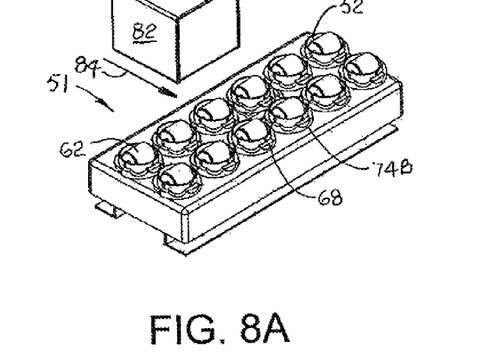
FIGS. 8A-8E are isometric views of the swivel sorter of FIG. 6A showing the sorting of a carton.
Figure 8B:
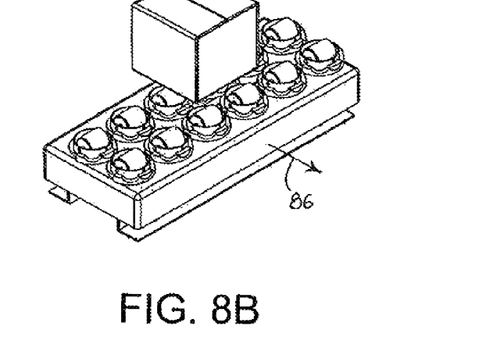
Figure 8C:
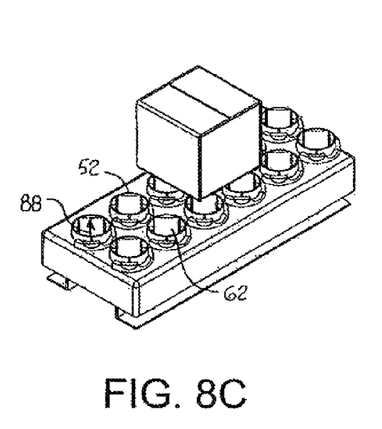
Figure 8D:
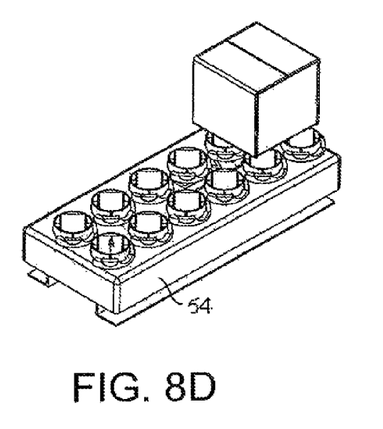
Figure 8E:
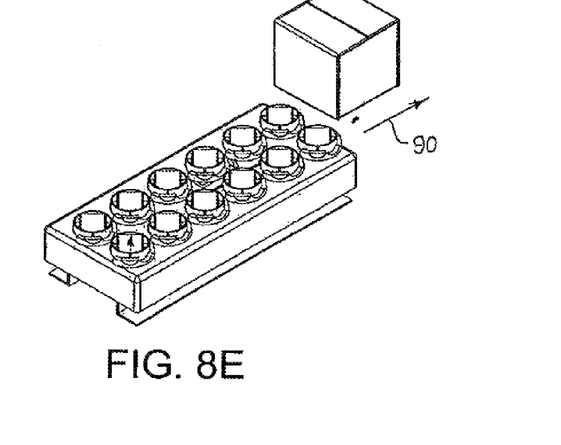

The operation of the sorter 51 of FIG. 6A is shown in FIGS. 8A-8E. In FIGS. 8A and 8B, the roller assemblies 52 are pivoted to their non-sorting pass-through positions with the plungers 68 in the middle detents 74B. An article 82 is fed onto the sorter 51 atop the rollers 62 in a main conveying direction 84. The momentum of the article 82 carries it along the non-actuated rollers 62 as shown in FIG. 8B. (With a dual-axis stator, the rollers can be actuated to rotate when in the in-line, 0° position.) If the rollers 62 are not swiveled and actuated to rotate, the article passes through the sorter and off in the direction of the arrow 86. If the sorter is energized to produce a magnetic flux wave that pivots the roller assemblies 52 and rotates the rollers 62 in the direction of the arrow 88, as in FIGS. 8C-8E, the combination of the forward, momentum-caused velocity of the article with the oblique rearward component of velocity caused by the actuated rotating rollers 62 results in the article's having a net velocity across the width of the platform that sorts the article 82 off the side of the sorter in the direction of the arrow 90. Reversing the direction of the linear stator's field swivels the roller assemblies 52 and sorts articles off the opposite side.

Figure 9:
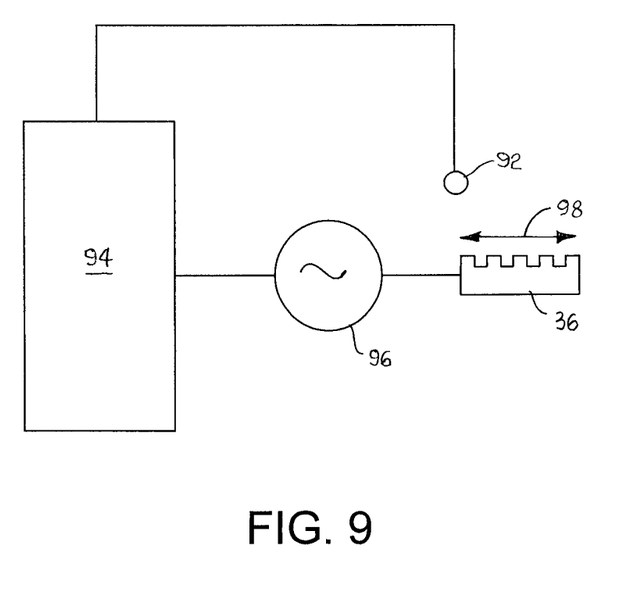
FIG. 9 is a block diagram of a control system usable with a sorter as in FIG. 1 or FIG. 6A.

As shown in FIG. 9, a controller, such as a programmable logic controller, computer, or other intelligent device, controls the frequency, phasing, and amplitude (including on and off) of the output of the ac power source 96. The phasing of the ac power source's output determines the propagation direction 98 of the magnetic flux wave and thereby the sorting direction. Encoders on the rollers or a visioning system 92 connected to the controller allow closed-loop, precise control of article trajectories.

The term "platform" is used in the specification and claims in a general sense to mean any sort of frame, base, or supporting structure, and the term "vertical" is not meant to be limited to its strict meaning of "perpendicular to the horizon," but is used as a convenient reference to indicate a direction perpendicular to the plane of the rollers, which would usually, but not always, be a horizontal plane.

Although the features of the invention have been described in detail with respect to a couple of exemplary versions, other versions are possible. For example, the rotors can include poles and be made of a ferrous material to form variable reluctance motors with the linear stators. Or the motors could include permanent magnet poles and form synchronous motors with the linear stators. Similarly, the armatures could be made of ferrous material or permanent magnets to form variable reluctance or synchronous motors with the stator. As another example, multiple sorters could be cascaded along a conveyor line to sort articles to many destinations. So, as these few examples suggest, the scope of the claims is not meant to be limited to the details of the exemplary versions used to describe the features and advantages of the invention.

What is claimed is:

1. A sorter comprising:
a platform;
a plurality of rollers supported by the platform, at least some of the rollers having rotors rotated about axes of rotation by interaction of the rotors with a magnetic flux wave;
a plurality of armature elements supported by the platform and movable with the plurality of rollers, wherein the armature elements are moved by interaction with a magnetic flux wave;
a linear stator propagating a magnetic flux wave across the platform, the magnetic flux wave interacting with the rotors and the armature elements;
a controller controlling the amplitude and propagation direction of the magnetic flux wave to selectively rotate the rollers having rotors and to selectively move the armature elements so that articles conveyed atop the rollers are pushed by the rollers in selected sorting directions.

2. A sorter as in claim 1 further comprising a plurality of cradles supported by the platform and pivotable about a vertical axis, wherein the rollers are supported in the cradles.

3. A sorter as in claim 2 wherein the armature elements are attached to the cradles and the magnetic flux wave causes the cradles to pivot about the vertical axis to change the orientation of the axes of rotation of the rollers and the sorting direction.

4. A sorter as in claim 1 wherein the plurality of rollers includes long rollers having rotors rotatable about axes of rotation parallel to a first direction and short rollers rotatable about axes of rotation parallel to a second direction perpendicular to the first direction, wherein the armature elements are coupled to the short rollers to selectively move the short rollers between a first level above the level of the long rollers to move conveyed articles in the first direction atop the short rollers and a second level below the level of the long rollers to move conveyed articles in the second direction atop the long rollers.

5. A sorter comprising:
a platform;
a plurality of roller assemblies supported by the platform, each of the roller assemblies including:
a cradle pivotable about a vertical axis and having an armature element pivoting the cradle by interaction of the armature element with a magnetic flux wave;
a roller supported in the cradle and having a rotor rotated about an axis of rotation by interaction of the rotor with a magnetic flux wave;
a linear stator propagating a magnetic flux wave across the platform, the magnetic flux wave interacting with the rotors to rotate the rollers about their axes of rotation and with the armature elements to pivot the cradles and orient the axes of rotation of the rollers.

6. A sorter as in claim 5 wherein the rotors are electrically conductive and form induction motors with the stator.

7. A sorter as in claim 5 wherein the rotors include poles made of a ferrous material and form variable reluctance motors with the stator.

8. A sorter as in claim 5 wherein the rotors include permanent magnets and form synchronous motors with the stator.

9. A sorter as in claim 5 wherein the armature elements are electrically conductive and form induction motors with the stator.

10. A sorter as in claim 5 wherein the armature elements include poles made of a ferrous material and form variable reluctance motors with the stator.

11. A sorter as in claim 5 wherein the armature elements include permanent magnets and form synchronous motors with the stator.

12. A sorter as in claim 5 further comprising fixed detents associated with each of the roller assemblies and wherein each cradle include a plunger that pivots with the cradle and that is received in one or another of the detents to set the axis of rotation of the roller.

13. A sorter as in claim 12 further comprising stops at each end of the detents to limit the angular pivot range of the cradle.

14. A sorter comprising:
a platform having a length and a width;
a first plurality of rollers supported by the platform and having rotors rotated about a first axial direction by interaction of the rotors with a magnetic flux wave;
a second plurality of rollers supported by the platform for rotation about a second axial direction perpendicular to the first axial direction, wherein the second plurality of rollers have armature elements that are moved by interaction with a magnetic flux wave to move the second plurality of rollers between a first level above the level of the first plurality of rollers and a second level below the level of the first plurality of rollers;
a linear stator propagating a magnetic flux wave traveling along the second axial direction and through the first and second pluralities of rollers;
wherein the magnetic flux wave interacts with the rotors to rotate the first plurality of rollers about the first axial direction and with the armature elements to move the second plurality of rollers to the second level below the level of the first plurality of rollers.

15. A sorter as in claim 14 wherein the rollers of the first plurality of rollers are aligned in first lanes across the width of the platform and the rollers of the second plurality of rollers are aligned in alternating second lanes across the width of the platform.

16. A sorter as in claim 14 further comprising springs biasing the second plurality of rollers up toward the first level above the level of the first plurality of rollers.

17. A sorter as in claim 16 wherein the springs push the second plurality of rollers up to the first level when the linear stator is de-energized and the magnetic flux wave is absent.

18. A sorter as in claim 14 wherein the axial length of the first plurality of rollers is longer than the axial length of the second plurality of rollers.

19. A sorter as in claim 14 wherein the first plurality of rollers have high-friction outer surfaces.

20. A sorter as in claim 14 wherein the second plurality of rollers include rotors and the linear stator propagates a second magnetic flux wave through the second plurality of rollers along the first axial direction that interacts with the rotors of the second plurality of rollers to rotate the second plurality of rollers about the second axial direction.

21. A sorter as in claim 14 wherein the rotors are electrically conductive and form induction motors with the stator.

22. A sorter as in claim 14 wherein the rotors include poles made of a ferrous material and form variable reluctance motors with the stator.

23. A sorter as in claim 14 wherein the rotors include permanent magnets and form synchronous motors with the stator.

\* \* \* \* \*